(12) United States Patent
Mueller

(10) Patent No.: US 8,535,071 B1
(45) Date of Patent: Sep. 17, 2013

(54) ELECTRICAL CONNECTOR

(75) Inventor: Benno Mueller, Munich (DE)

(73) Assignee: Schaltbau GmbH, Munich (DE)

( * ) Notice: Subject to any disclaimer, the term of this patent is extended or adjusted under 35 U.S.C. 154(b) by 0 days.

(21) Appl. No.: 13/453,836

(22) Filed: Apr. 23, 2012

(30) Foreign Application Priority Data

Apr. 20, 2012 (DE) .......................... 10 2012 007 911

(51) Int. Cl.
*H01R 13/44* (2006.01)

(52) U.S. Cl.
USPC .......................................... 439/144; 439/923

(58) Field of Classification Search
USPC .............. 439/34, 35, 455, 453, 135, 144, 923
See application file for complete search history.

(56) References Cited

U.S. PATENT DOCUMENTS

| | | | | |
|---|---|---|---|---|
| 2,217,496 | A * | 10/1940 | Riley | 439/136 |
| 3,431,428 | A * | 3/1969 | Van Valer | 307/10.1 |
| 5,024,604 | A * | 6/1991 | Savin et al. | 439/345 |
| 5,545,046 | A * | 8/1996 | Masuda et al. | 439/142 |
| 5,605,466 | A * | 2/1997 | Devlin et al. | 439/144 |
| 6,287,136 | B1 * | 9/2001 | Deutsch | 439/337 |
| 6,745,911 | B1 | 6/2004 | Maestranzi | |
| 6,827,601 | B1 * | 12/2004 | Haeberle | 439/447 |
| 7,021,959 | B2 * | 4/2006 | Tsuji et al. | 439/470 |
| 7,195,512 | B2 * | 3/2007 | Jenkinson et al. | 439/372 |
| 7,575,450 | B2 * | 8/2009 | Williams et al. | 439/144 |
| 7,850,371 | B2 * | 12/2010 | Riley et al. | 385/77 |
| 8,192,216 | B1 * | 6/2012 | Puluc et al. | 439/271 |
| 8,328,223 | B2 * | 12/2012 | Leinenger | 280/504 |
| 2007/0072461 | A1 * | 3/2007 | Williams et al. | 439/144 |
| 2010/0144197 | A1 * | 6/2010 | Rotenberg et al. | 439/573 |
| 2012/0309214 | A1 * | 12/2012 | Beluse | 439/180 |

FOREIGN PATENT DOCUMENTS

| | | |
|---|---|---|
| DE | 1207983 B | 12/1965 |
| DE | 3327087 C1 | 8/1984 |
| DE | 19547231 A1 | 6/1997 |
| DE | 29800542 U1 | 3/1998 |
| DE | 102007030537 A1 | 1/2009 |
| DE | 2002009002880 U1 | 7/2010 |
| WO | WO2010019625 A1 | 2/2012 |

OTHER PUBLICATIONS

International Search Report in PCT Application No. PCT/EP2013/000335 mailed Mar. 21, 2013.
German Office Action in German Application No. 102012007911.7 mailed Mar. 8, 2013.

* cited by examiner

*Primary Examiner* — Neil Abrams
*Assistant Examiner* — Phuongchi T Nguyen
(74) *Attorney, Agent, or Firm* — Kilpatrick Townsend & Stockton LLP

(57) ABSTRACT

Disclosed is a plug-type connection having a plug and a socket with a plug-in opening for the plug. The socket includes a socket housing and at least one retaining element connected to the socket housing and movable about a first pivot axis. The retaining element secures the plug plugged into the plug-in opening against slipping out of the plug-in opening. A means is provided to displace the retaining element about the first pivot axis out of the position securing the plug against slipping out, thereby releasing the plug, if a specific force acting on the plug opposite to the plug-in direction is exceeded.

10 Claims, 4 Drawing Sheets

ELECTRICAL CONNECTOR

CROSS-REFERENCE TO RELATED APPLICATIONS

This application claims priority to German Patent Application No. 10 2012 007 911.7, filed Apr. 20, 2012, the disclosure of which is incorporated by reference herein.

BACKGROUND OF THE INVENTION

Plug-type connections are known in the prior art, whose socket is closed by a lid if the plug is not plugged in, the lid being rotatably mounted on the socket housing. In most cases, the lid is preloaded by means of a spring, so as to close the plug-in opening of the socket automatically as soon as the plug is pulled out of the socket. Most of the plug-type connections of this kind known in the prior art have a snap-in nose formed on the lid of the socket which, if the plug is plugged in, is engaged with or engaged behind the plug itself or a suitable protrusion formed on the plug, so that the plug is secured against slipping out of the socket. The spring preload of the lid makes sure that the snap-in nose of the socket lid remains constantly engaged with the plug. Thus, the plug is always secured against slipping out of the socket. A plug-type connection of this kind is known, for example, from EP 0568030 A1. In this plug-type connection sharp-edged structures are formed on the snap-in nose of the socket lid, which interact with sharp-edged structures on the plug side. By this, it is to be prevented at any rate that the hinged lid of the socket opens, thereby releasing the plug inadvertently, with the consequence that the plug can slip out of the socket.

The problem of plug-type connections of this kind is that a strong tensile load acting on the plug or the cable connected to the plug may cause damage to the plug-type connection or the cable. The plug-type connection can be used, for example, for the electrical interconnection between a towing vehicle and a trailer or implement. The plug-type connection is not configured, however, to couple a towing vehicle and a trailer to each other mechanically. To this end, a mechanical coupling is provided. It occasionally happens that the mechanical coupling between the towing vehicle and the trailer is undone without simultaneously disengaging the electrical plug-type connection. This negligence may result in the movement of the towing vehicle without the trailer which, as a rule, causes damage to the plug-type connection and results in the tearing off of the electrical connecting cable.

To overcome this problem it has already been proposed in DE 1207983 A to attach a flexible clamp to the socket lid, which runs across the cable hanging down from the plug. Pulling on the cable makes the cable get tensioned, thereby starting to displace the clamp out of its rest position. If a certain tensile load is reached the displacement of the clamp opens the socket lid. The snap-in nose formed on the socket lid thereby releases the plug, allowing it to be pulled out of the socket.

A problem occurs if the tensile load acting on the plug and the cable does not act in the longitudinal direction of the plug. This is the case, for example, if the towing vehicle is not driven straight forward, but at a certain angle relative to the longitudinal axis of the trailer. In this case the cable is not tensioned in the longitudinal direction of the plug, but obliquely to the longitudinal direction of the plug. In the plug-type connection known from DE 1207983 A this problem is overcome by providing the flexible clamp attached to the socket lid with a certain width, allowing it to be displaced also by an obliquely tensioned cable. With respect to cables tensioned obliquely relative to the longitudinal direction of the plug this solution is suitable only to a limited extent, however. Furthermore, the resultant cable run has proved to be disadvantageous. Especially if the pull-out angles are very oblique, the cable is very strongly loaded at the point of entry into the plug at the rear end of the plug. If the pull-out angles are very oblique, a strong kink in the cable is caused at this point.

BRIEF SUMMARY OF THE INVENTION

The present invention relates to a plug-type connection, specifically for the electrical interconnection between a towing vehicle and a trailer or implement. Such a plug-type connection comprises a plug and a socket with a plug-in opening, into which the plug can be plugged. The socket comprises a socket housing with the plug-in opening, and at least one retaining element connected to the socket housing. The retaining element is mounted to be movable relative to the socket housing about a first pivot axis, and secures the plug plugged into the plug-in opening against slipping out of the plug-in opening. Further, a means is provided to displace the retaining element about the first pivot axis out of the position securing the plug against slipping out, thereby releasing the plug, if a specific force acting on the plug opposite to the plug-in direction is exceeded.

The present invention is, therefore, based on the object to develop the plug-type connection of the aforementioned kind further in such a way that the plug is optimally secured against slipping out of the socket up to a certain tensile load, even if the cable is tensioned obliquely. At the same time, damages to the socket, plug and especially the cable are effectively prevented.

The object is achieved by the technical features of independent claim 1. According to the invention the problem is solved if the plug comprises a first plug part pluggable into the plug-in opening and having a first plug axis, and a second plug part having a second plug axis and interacting with the retaining element, wherein the plug is flexible at least between the first plug part and the second plug part so that the second plug part can be displaced relative to the first plug part from a straight position, in which the second plug axis coincides with the first plug axis, to an oblique position, in which the second plug axis encloses an angle relative to the first plug axis, wherein the retaining element is rotatable about a second pivot axis, and wherein the first pivot axis and the second pivot axis are different from each other and enclose an angle relative to each other.

The flexibility of the plug virtually allows the plug to bend. Thus, the rear end of the plug, from which the cable is passed out, can be pivoted relative to the front part of the plug, which is plugged into the socket. The kink formed in the cable at the point where the cable enters into the rear end of the plug is, therefore, extremely small, even if the cable is tensioned very obliquely, so that damage to the cable at this point is avoided. Due to the two pivot axes provided in accordance with the invention, the retaining element, which secures the plug against slipping out of the socket, can be repositioned in an optimum manner if the plug is deformed as a result of an obliquely tensioned cable. Thus, the retaining element is always ideally aligned so as to secure the rear plug part up to a certain tensile load. The retaining element pivots so to speak along with the rear part of the plug.

Advantageous embodiments of the present invention are defined in the dependent claims.

Preferably, the first pivot axis and the second pivot axis do not intersect each other. If the plug is plugged in, the first pivot axis is preferably slightly more away from the plug-in opening than the second pivot axis. By this, the rear end of the plug and the retaining element acting on the rear end of the plug are capable of moving synchronously.

In a preferred embodiment of the present invention the second pivot axis stands perpendicularly on a plane in which the first pivot axis lies. By this, the retaining element always releases the plug reliably as of a certain tensile load, even if the cable is tensioned obliquely. Further, it is an advantage if the second pivot axis coincides with an imagined axis about which the second plug part can be displaced relative to the first plug part from the straight position to the oblique position due to the flexibility of the plug, if the plug is plugged in. Preferably, the first pivot axis thereby always lies in a plane that runs orthogonally relative to the second plug axis. By this, too, it is ensured that the retaining element always releases the plug reliably, even if the cable is tensioned obliquely. Also, the second pivot axis may nearly coincide with the imagined axis.

In another, specifically preferred embodiment of the present invention a lid of the socket comprises a first lid part and a second lid part, wherein the first lid part is rotatably mounted on the socket housing about a third pivot axis, the second lid part is rotatable relative to the first lid part about the second pivot axis, and the retaining element is rotatably mounted on the second lid part about the first pivot axis. The lid, which closes the plug-in opening of the socket if the plug is not plugged in, thus simultaneously forms the inventive retaining element for the plug. To be capable of inserting the plug into the plug-in opening the lid has to be opened, of course. Preferably, the second pivot axis in this embodiment extends centrally through the two-part lid, thereby standing perpendicularly on the plane spanned by the lid itself. Preferably, the first lid part and the second lid part are disc-shaped and lie surface on surface. The first lid part thereby defines the lower part of the lid, by means of which the plug-in opening is closed if the plug is not plugged in. The second lid part defines the upper part of the lid and merely serves as a holder for the retaining element.

In this embodiment it is a particular advantage if the first pivot axis and the third pivot axis are aligned parallel relative to each other if the second plug part is in a straight position.

Furthermore, this embodiment preferably provides for a return spring associated with the third pivot axis, by means of which the lid is preloaded about the third pivot axis so as to close the plug-in opening if the plug is not plugged in. Also, the return spring makes sure that the retaining element is reliably held on the plug.

In another, specifically preferred embodiment of the present invention two clamps are provided as retaining elements, which extend substantially parallel to each other and are each rotatable with one of their ends about the mutual first pivot axis, wherein the two clamps are arranged symmetrically relative to the second plug axis. The two clamps can thus encompass the rear plug end, where the cable comes out, on both sides of the cable, thereby reliably securing the plug against slipping out of the plug-in opening. The symmetrical arrangement of the two clamps allows a uniform load handling and prevents the plug from tilting relative to the retaining elements. The two clamps may be connected to each other rigidly, so that they open simultaneously as soon as a certain pull-out force acting on the plug is reached. Alternatively, the two clamps may also be movable independently of each other.

It is specifically preferred that each clamp comprises at least one form closure element, which is engaged with a corresponding form closure element of the plug as soon as the clamps secure the plugged in plug against slipping out of the plug-in opening. This guarantees a stable support of the plug in the socket until the predetermined maximum load is reached. For example, a recess may be formed in the clamp, which interacts with a bump formed at the end of the plug or a corresponding protrusion at the end of the plug.

In another preferred embodiment of the present invention the means, by means of which the retaining element is displaced about the first pivot axis out of the position securing the plug against slipping out, thereby releasing the plug, if a specific force acting on the plug opposite to the plug-in direction is exceeded, is a spring associated with the first pivot axis. Preferably, the spring is designed as a coil spring and is oriented in the direction of the first pivot axis. The spring presses the two clamps or the retaining element, respectively, against the second plug part, that is, against the rear part of the plug, so as to secure the plug against slipping out. The spring force of the spring is rated such that the retaining element or, respectively, the two clamps provided in accordance with the invention open, thereby releasing the plug, if the pull-out force acting on the plug exceeds a certain value. This is the case if the cable is very strongly tensioned. This predetermined value is chosen such that the plug is released in any case before the cable is torn out or the plug-type connection is damaged.

Furthermore, in another preferred embodiment of the present invention, a return spring associated with the second pivot axis is provided, by means of which the retaining element is preloaded about the second pivot axis into a preferred position in which the retaining element is oriented to optimally secure the plugged in plug if the second plug part is in the straight position. Preferably, the first pivot axis in the preferred position lies in a plane that extends perpendicularly to the longitudinal axis of the plug. This embodiment ensures that the plug is straightened, if feasible, if the load is small.

BRIEF DESCRIPTION OF THE DRAWINGS

An exemplary embodiment of the present invention will be explained in more detail below by means of drawings. In the drawings.

DETAILED DESCRIPTION OF THE INVENTION

In the following description, like components will be designated with like reference numbers. If a drawing contains reference numbers that are not explained in more detail in the associated description of the drawings, reference will be made to preceding figure descriptions or figure descriptions to follow.

Figure 1:
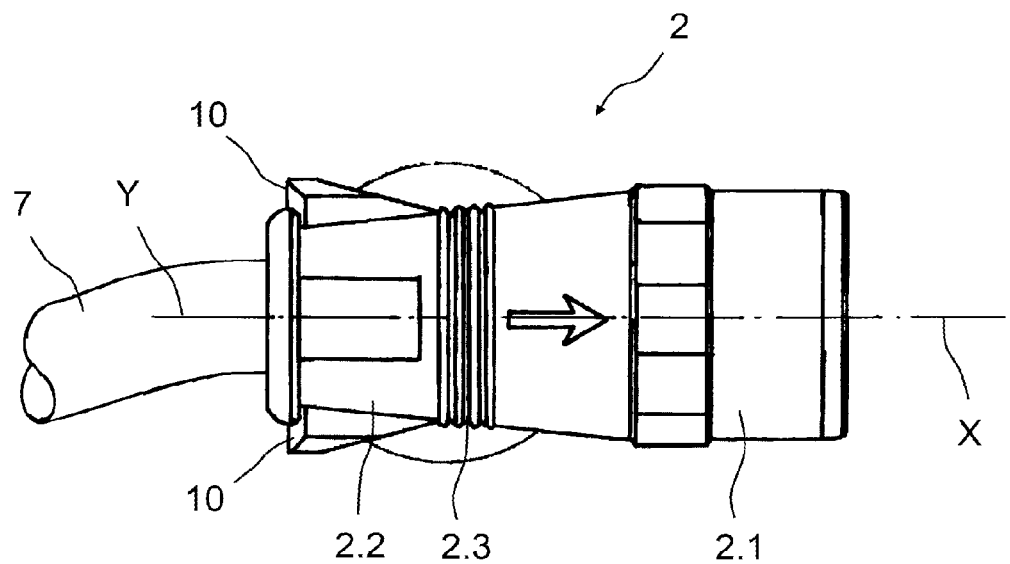
FIG. 1 shows a lateral view of the plug of a plug-type connection according to the invention.
Figure 2:
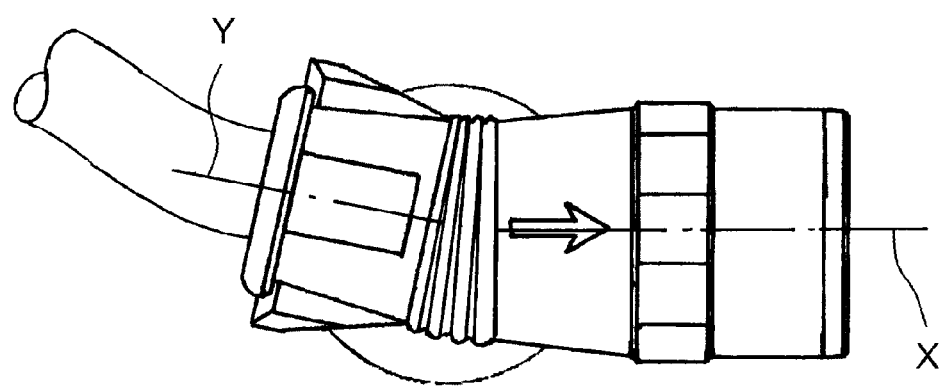
FIG. 2 shows the plug of FIG. 1 in a deformed state.

FIG. 1 shows the plug 2 of a plug-type connection according to the invention. It comprises a first front plug part 2.1 and a second rear plug part 2.2, the two plug parts 2.1 and 2.2 being connected to each other by a flexible plug part 2.3. The plug 2 can be plugged into the socket illustrated in FIG. 3 with the first front plug part 2.1. The cable 7 is passed out of the second rear plug part 2.2. Furthermore, two protrusions 10 can be seen on the rear plug part 2.2, whose function will be explained below. FIG. 1 shows the plug in an unloaded condition. The longitudinal axis X of the first plug part 2.1 coincides in this condition of the plug with the longitudinal axis Y of the second plug part 2.2. The flexible part 2.3 between the first plug part 2.1 and the second plug part 2.3 allows the second rear plug part 2.2 to be pivoted relative to the first plug part 2.1, so that the two axes X and Y enclose an angle relative to each other, as is shown in FIG. 2.

Figure 3:
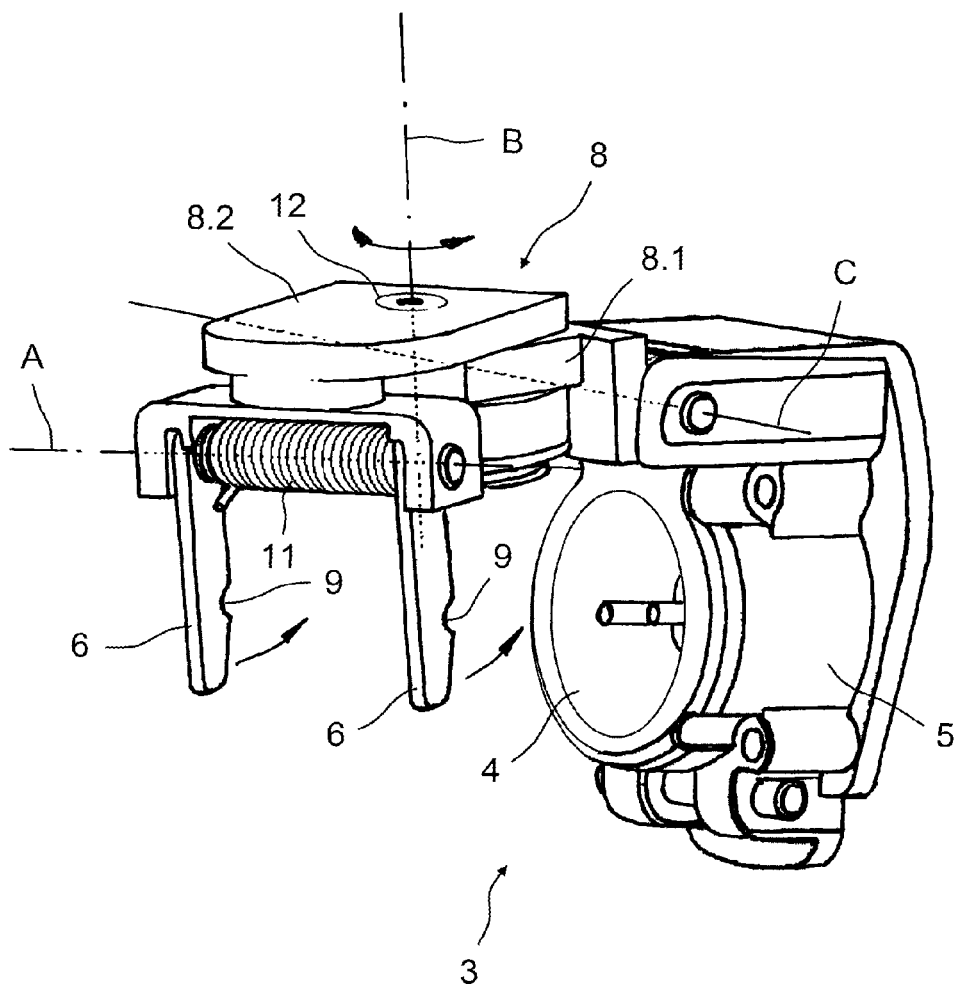
FIG. 3 shows an oblique view of the socket of the plug-type connection according to the invention.

FIG. 3 shows the socket 3 of the plug-type connection according to the invention. It consists of a socket housing 5 and a lid 8 mounted on the socket housing to be pivotable about the axis C. The socket housing 5 includes a plug-in opening 4 into which the plug shown in FIGS. 1 and 2 can be inserted. In the joint between the socket housing 5 and the lid 8 a non-illustrated spring is provided, which makes sure that the lid is shut and closes the plug-in opening 4 if the plug is not plugged in. The lid 8 comprises two parts, namely, a lower part 8.1, which is hinged to the socket housing 5 about the pivot axis C, and an upper lid part 8.2, which can, in turn, be rotated relative to the lower lid part 8.1 about the pivot axis B. Pivot axis B stands substantially perpendicularly on a plane that is spanned by lid 8. Two retaining clamps 6 are mounted on the front end of the upper lid part 8.2, by means of which the plug shown in FIGS. 1 and 2, when plugged in, is secured against slipping out of the socket. The two clamps 6 are not rigidly connected to the upper lid part 8.2, but are rotatably mounted on the same about the pivot axis A. The spring 11 ensures that the two clamps 6 exert a force on the plug, the force acting in the direction of the socket, and fold upwardly into the plane of lid 8 if the plug is not plugged in.

Figure 4:
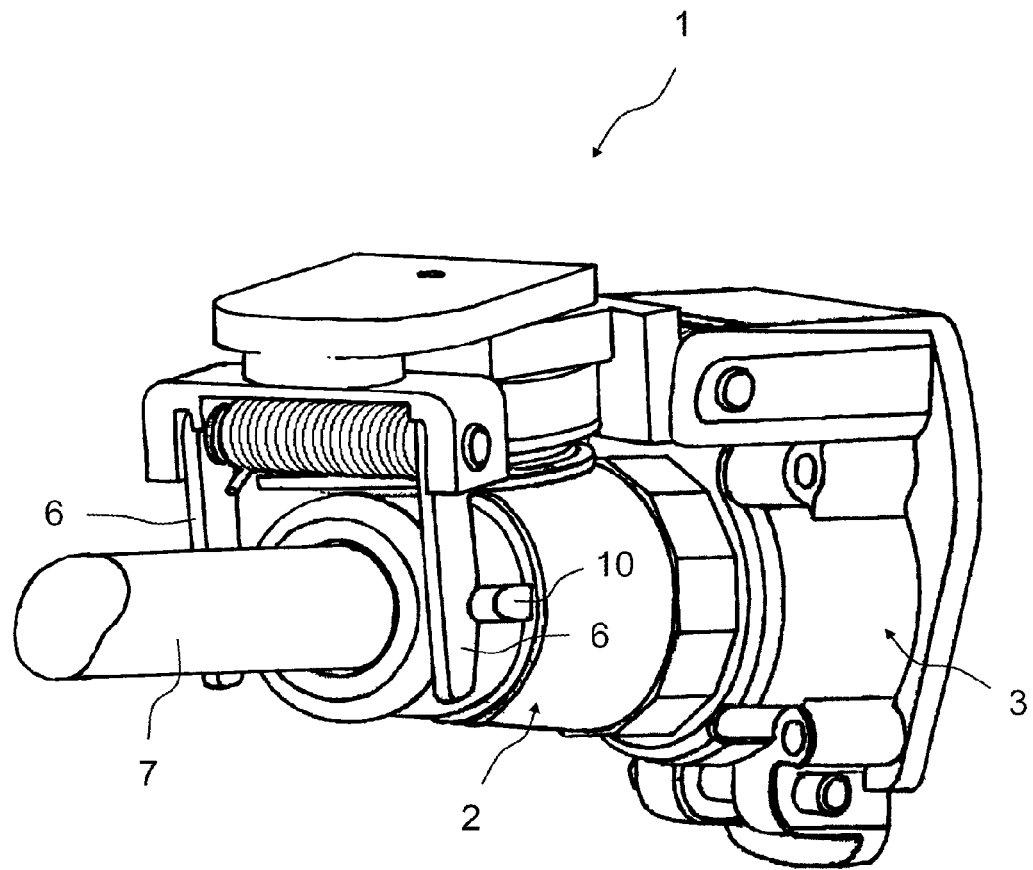
FIG. 4 shows the plug-type connection according to the invention with a plugged in plug.
Figure 5:
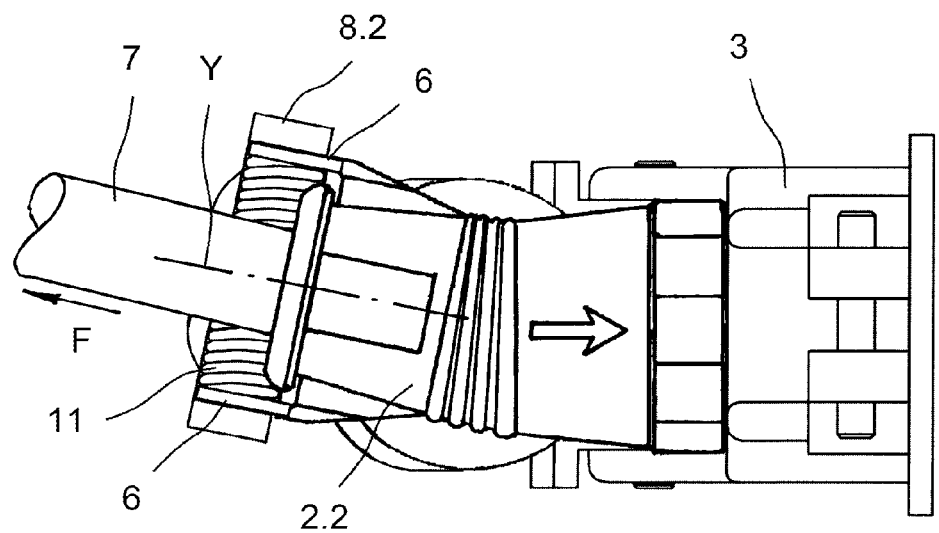
FIG. 5 shows a bottom view of the plug-type connection according to the invention of FIG. 4.

The two clamps 6 each include a recess 9 which, if the plug is plugged in, become engaged with the two protrusions 10 on the rear plug end, which are shown in FIG. 1. This is illustrated in FIG. 4, in which the plug-type connection 1 according to the invention is shown with the plug being plugged in. FIG. 5 shows a bottom view of the plug-type connection 1 of FIG. 4. It can be seen that the cable coming out of the plug end is tensioned obliquely. Thus, the plug 2 is bent, so that the axis Y of the second plug part 2.2 encloses an angle relative to axis X of the first plug part 2.1, as is already depicted in FIG. 2. The pivot axis B shown in FIG. 3 between the lower lid part 8.1 and the upper lid part 8.2 allows the upper lid part 8.2 to rotate along with the second plug part 2.2, so that the two clamps 6 fit closely to the two protrusions 10 of the second rear plug part 2.2 in an optimal fashion, despite this oblique position of the plug. FIG. 5 further shows that the two clamps 6 are symmetrically adjacent to the second plug axis Y, and thus to both sides of the cable 7, on the rear plug part 2.2. The spring force of the spring 11 is rated to make the two clamps 6 spring open and release the plug 2 as soon as the tensile force F acting on the cable exceeds a predetermined value.

Figure 6:
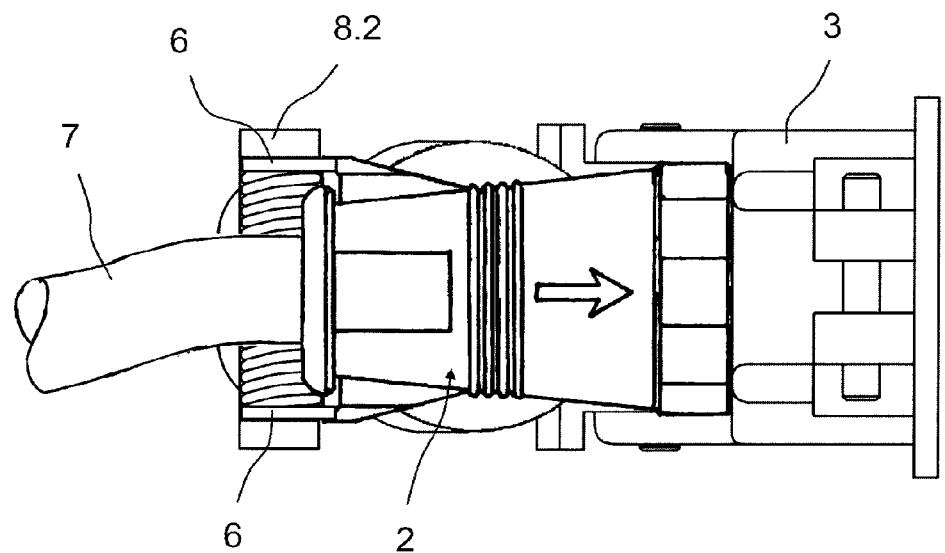
FIG. 6 shows the plug-type connection according to the invention of FIGS. 4 and 5 with a relaxed cable.

For comparison, FIG. 6 shows the plug-type connection according to the invention with a relaxed cable 7. The spring 12 outlined in FIG. 3 ensures that the upper lid part 8.2, together with the two retaining clamps 6, is pivoted back to a straight position, in which the orientation of the upper lid part 8.2 corresponds so to speak with a straight orientation of the plug.

The invention claimed is:

1. A plug-type connection (1), specifically for the electrical interconnection between a towing vehicle and a trailer, comprising a plug (2) and a socket (3) with a plug-in opening (4) for the plug (3), the socket comprising a socket housing (5) and at least one retaining element (6) connected to the socket housing (5) and movable about a first pivot axis (A), which secures the plug (2) plugged into the plug-in opening (4) against slipping out of the plug-in opening (4), wherein a means is provided to displace the retaining element (6) about the first pivot axis (A) out of the position securing the plug (2) against slipping out, thereby releasing the plug (2), if a specific force acting on the plug (2) opposite to the plug-in direction is exceeded, characterized in that the plug (2) comprises a first plug part (2.1) pluggable into the plug-in opening (4) and having a first plug axis (X), and a second plug part (2.2) having a second plug axis (Y) and interacting with the retaining element (6), wherein the plug (2) is flexible at least between the first plug part (2.1) and the second plug part (2.2) so that the second plug part (2.2) can be displaced relative to the first plug part (2.1) from a straight position, in which the second plug axis (Y) coincides with the first plug axis (X), to an oblique position, in which the second plug axis (Y) encloses an angle relative to the first plug axis (X), wherein the retaining element (6) is rotatable about a second pivot axis (B), and wherein the first pivot axis (A) and the second pivot axis (B) are different from each other and enclose an angle relative to each other.

2. A plug-type connection (1) according to claim 1, characterized in that the second pivot axis (B) stands perpendicularly on a plane in which the first pivot axis (A) lies.

3. A plug-type connection (1) according to claim 1, characterized in that the second pivot axis (B) coincides with an imagined axis about which the second plug part (2.2) can be displaced relative to the first plug part (2.1) from the straight position to the oblique position due to the flexibility of the plug (2), if the plug (2) is plugged in.

4. A plug-type connection (1) according to claim 1, characterized in that the means, by means of which the retaining element (6) is displaced about the first pivot axis (A) out of the position securing the plug (2) against slipping out, thereby releasing the plug (2), if a specific force acting on the plug (2) opposite to the plug-in direction is exceeded, is a spring (11) associated with the first pivot axis (A).

5. A plug-type connection (1) according to claim 1, characterized in that furthermore a return spring (12) associated with the second pivot axis (B) is provided, by means of which the retaining element (6) is preloaded about the second pivot axis (B) into a preferred position in which the retaining element (6) is oriented to optimally secure the plugged in plug (2) if the second plug part (2.2) is in the straight position.

6. A plug-type connection (1) according to claim 1, characterized in that two clamps are provided as retaining elements (6), which extend substantially parallel to each other and are each rotatable with one of their ends about the mutual first pivot axis (A), wherein the two clamps are arranged symmetrically relative to the second plug axis (Y).

7. A plug-type connection (1) according to claim 6, characterized in that each clamp comprises at least one form closure element (9), which is engaged with a corresponding form closure element (10) of the plug (2) as soon as the clamps secure the plugged in plug (2) against slipping out of the plug-in opening (4).

8. A plug-type connection (1) according to claim 1, characterized in that a lid (8) of the socket (3) comprises a first lid part (8.1) and a second lid part (8.2), wherein the first lid part (8.1) is rotatably mounted on the socket housing (5) about a third pivot axis (C), wherein the second lid part (8.2) is rotatable relative to the first lid part (8.1) about the second pivot axis (B), and wherein the retaining element (6) is rotatably mounted on the second lid part (8.2) about the first pivot axis (A).

9. A plug-type connection (1) according to claim 8, characterized in that the first pivot axis (A) and the third pivot axis (C) are aligned parallel relative to each other if the second plug part (2.2) is in the straight position.

10. A plug-type connection (1) according to claim 8, characterized in that a return spring (13) associated with the third pivot axis (C) is provided, by means of which the lid (8) is preloaded about the third pivot axis (C) so as to close the plug-in opening (4) if the plug (2) is not plugged in.

* * * * *